United States Patent [19]
Bieri

[11] Patent Number: 6,109,493
[45] Date of Patent: *Aug. 29, 2000

[54] INSIDE TRIM FOR A VEHICLE

[75] Inventor: Frédéric Bieri, Gondecourt, France

[73] Assignee: Plastic Omnium Auto Interierur, Carteret Lyon, France

[*] Notice: This patent is subject to a terminal disclaimer.

[21] Appl. No.: 08/975,855

[22] Filed: Nov. 21, 1997

[30] Foreign Application Priority Data

Nov. 21, 1996 [FR] France .................................. 96 14493

[51] Int. Cl.$^7$ ...................................................... B60R 7/06
[52] U.S. Cl. ......................... 224/483; 224/281; 224/542; 296/37.12; 312/205; 312/319.1; 340/686.1
[58] Field of Search ............................... 296/37.8, 37.12, 296/37.13, 37.16; 312/9.57, 9.63, 185, 205, 319.1; 224/275, 281, 282, 483, 539, 542; 340/686.1, 569, 570; 292/169, 175

[56] References Cited

U.S. PATENT DOCUMENTS

| | | | |
|---|---|---|---|
| 864,282 | 8/1907 | Altmyer | 224/483 |
| 1,895,061 | 1/1933 | Worssam | 132/287 |
| 1,973,479 | 9/1934 | Green et al. | 206/527 |
| 2,160,282 | 5/1939 | Rehg | 312/235.6 |
| 2,887,216 | 5/1959 | Hargraves | 224/277 |
| 3,004,655 | 10/1961 | Whitnack | 224/483 |
| 3,165,247 | 1/1965 | Burns | 224/275 |
| 3,595,433 | 7/1971 | Jones | 206/737 |
| 3,632,029 | 1/1972 | Sonner | 224/29 D |
| 4,800,822 | 1/1989 | Adkins | 109/19 |
| 4,927,200 | 5/1990 | Wilkins | 296/37.8 |
| 4,966,318 | 10/1990 | Dutka | 224/42.46 R |
| 5,065,920 | 11/1991 | Amner | 224/275 |
| 5,072,983 | 12/1991 | Muroi et al. | 296/37.13 |
| 5,226,576 | 7/1993 | Ellsworth | 224/42.46 R |
| 5,363,960 | 11/1994 | Ackeret | 206/387 |
| 5,372,289 | 12/1994 | Dachicourt | 224/311 |
| 5,440,107 | 8/1995 | Phillips | 235/10 |
| 5,474,375 | 12/1995 | Hollenstein et al. | 312/319.1 |
| 5,625,533 | 4/1997 | Kim et al. | 361/681 |
| 5,754,112 | 5/1998 | Novak | 340/635 |
| 5,795,005 | 8/1998 | Garfias et al. | 296/37.5 |
| 5,881,934 | 3/1999 | Hung | 224/275 |
| 5,915,776 | 6/1999 | Bieri | 296/37.1 |

FOREIGN PATENT DOCUMENTS

| | | | |
|---|---|---|---|
| 962342 | 6/1950 | France | 224/282 |
| 2567821 | 1/1986 | France | 224/483 |
| 1044502 | 8/1983 | U.S.S.R. | 224/539 |
| 915046 | 1/1960 | United Kingdom | 224/275 |

*Primary Examiner*—D. Glenn Dayoan
*Assistant Examiner*—Paul Chenevert
*Attorney, Agent, or Firm*—Harrison & Egbert

[57] ABSTRACT

The present invention relates to an inside trim for a vehicle, such as, for example, a motor vehicle.

According to the invention, the inside trim is formed by at least a case (1) for stowing articles and by a housing (2) provided in the interior of the vehicle, the case (1) being designed to be removable, fully or in part, in relation to the housing (2), and the trim being provided with means for displacing and/or deploying the storage space defined by the case (1) outside the housing (2).

14 Claims, 4 Drawing Sheets

INSIDE TRIM FOR A VEHICLE

TECHNICAL FIELD

The present invention relates to inside trim for a vehicle such as, for example, a motor vehicle.

However, although more especially intended for such applications, it can also be used in any other type of vehicle.

BACKGROUND ART

When travelling, the driver and/or the passengers of a vehicle most often wish to have various items at their disposal so they can work and/or relax both inside their vehicles and, once they have arrived, outside their vehicles.

At present motor vehicles are fitted with receptacles such as, glove compartments or other devices in which articles can be deposited. However, once they have been stowed away, the articles are no longer available.

Thus, in order to be able to use them, the driver and/or the passengers have to keep them in easy reach, for example, by placing them on the bench seats and/or individual seats available. These articles then clutter up the vehicle interior. They are further liable to be damaged and/or turn into dangerous projectiles in the event of a collision, or even attract the attention of thieves.

In addition, at each stop, if the driver and/or the passengers wish to take the articles with them, they are obliged to transfer them to other recipients such as, bags, briefcases or others, and then to perform the reverse operation when they travel on.

It has thus been noted, in the case of persons using their vehicles for professional reasons, and who wish to be able to keep a series of instruments or tools necessary for their work permanently in easy reach, such repetitive operations represent a considerable constraint and lead to time wasting and deterioration.

The object of the present invention is to remedy the aforementioned drawbacks and to provide an inside trim for a vehicle enabling an article and/or a series of articles to be stowed and kept accessible inside and/or outside the vehicle.

Another object of the present invention is to provide an inside trim for a vehicle that enables the available storage space to be increased.

Another object of the present invention is to provide an inside trim for a vehicle that functions simply and reliably.

A further object of the present invention is to provide an inside trim for a motor vehicle having an adjustable structure.

Further objects and advantages of the present invention will emerge in the course of the description that follows, which is provided solely by way of illustration and is not intended to limit same.

SUMMARY OF THE INVENTION

The present invention relates to an inside trim for a vehicle such as a motor vehicle, formed at least by a box or case for stowing articles and by a housing, provided in the interior of the vehicle, the case being designed for removal, wholly or in part, in relation to the housing, and the trim being provided with means for displacing and/or deploying the storage space defined by the case outside the housing.

BRIEF DESCRIPTION OF THE DRAWINGS

The present invention will be more readily understood from a study of the following description accompanied by the annexed drawings which form an integral part thereof, and wherein.

DETAILED DESCRIPTION OF THE INVENTION

As shown in FIGS. 1 to 7, the inside trim for a vehicle according to the invention is formed by at least one case 1 for storing articles and by a housing 2, provided in the interior of the vehicle.

The housing 2 has, a back surrounded, at least partially, by side walls defining an opening on the side opposite the back of the housing.

According to the invention, case 1 is designed for removal, wholly or in part, in relation to the housing 2. In addition, the inside trim for a vehicle is provided with means for displacing and/or deploying the storage space defined by the case 1 outside the housing 2.

According to the different exemplary forms of embodiment illustrated, the housing 2 is provided in the area of the dashboard of the vehicle. According to other exemplary forms of embodiment, it can also be provided in the area of a door panel of the vehicle and/or of a shelf or holder provided, in the vicinity of the driving position of the driver of the vehicle.

As described in more detail hereinafter, the inside trim for a vehicle according to the invention further, includes means 3 for supporting additional storing and/or fixing means 4.

In addition, case 1 is provided, in particular, with locking means such as, a lock.

Figure 1:
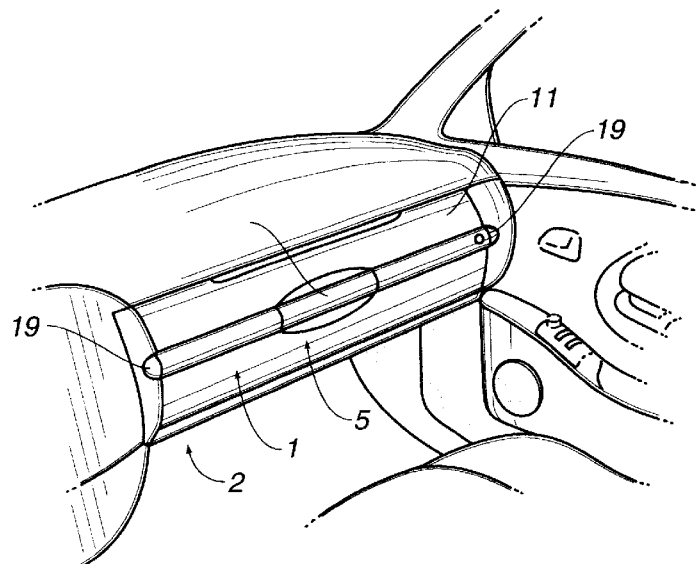
FIG. 1 is a perspective view of a first exemplary form of embodiment of an inside trim for a vehicle according to the invention, in a first condition.
Figure 2:
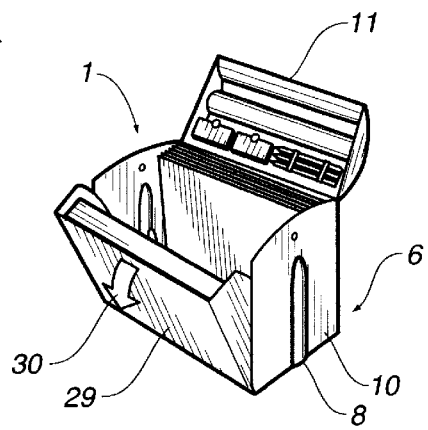
FIG. 2 is a perspective view of one of the items of the inside trim for a vehicle shown in FIG. 1, in a second condition.
Figure 3:
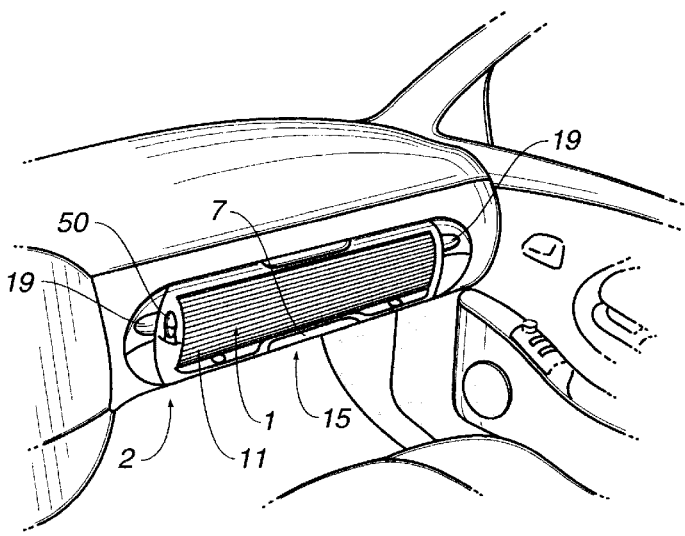
FIG. 3 is a perspective view of a second exemplary form of embodiment of an inside trim for a vehicle according to the invention, in a first condition.
Figure 4:
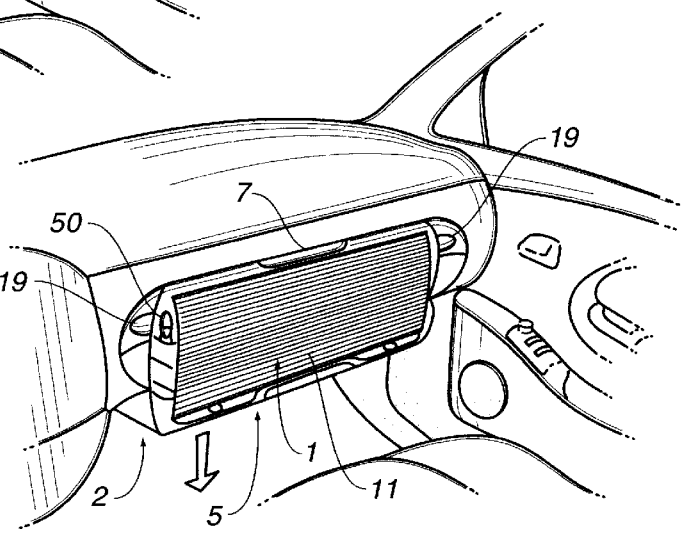
FIG. 4 is a perspective view or the inside trim for a vehicle shown in FIG. 3 above, in a second condition.
Figure 5:
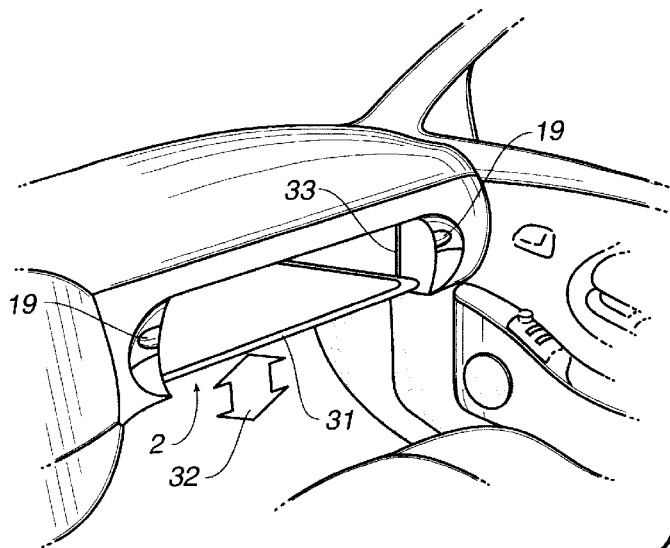
FIG. 5 is a perspective view of one of the items of the inside trim for a vehicle shown in FIG. 3 above, in a third condition.
Figure 6:
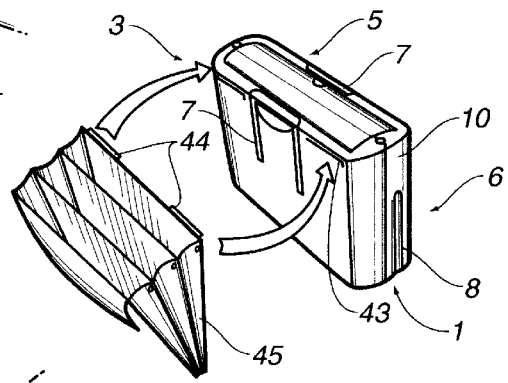
FIG. 6 is a perspective view of other items of the inside trim for a vehicle described in FIG. 3 above, in a fourth condition.

According to the forms of embodiment corresponding to FIGS. 1 to 6, the case 1 is capable, as more particularly illustrated by FIGS. 2 and 6, of being transported integrally inside and/or outside the vehicle. In addition, the means for displacing and/or deploying the storage space include, in particular, at least gripping means 5 and/or means 6 for extracting the case 1 from the housing 2 and inserting it into the housing.

To make it easier to install and/or fix articles inside the cases 1, the latter are provided, with filing and/or other pockets.

The gripping means 5 are formed, in particular, by a handle 7, provided on the case 1.

Figure 8:
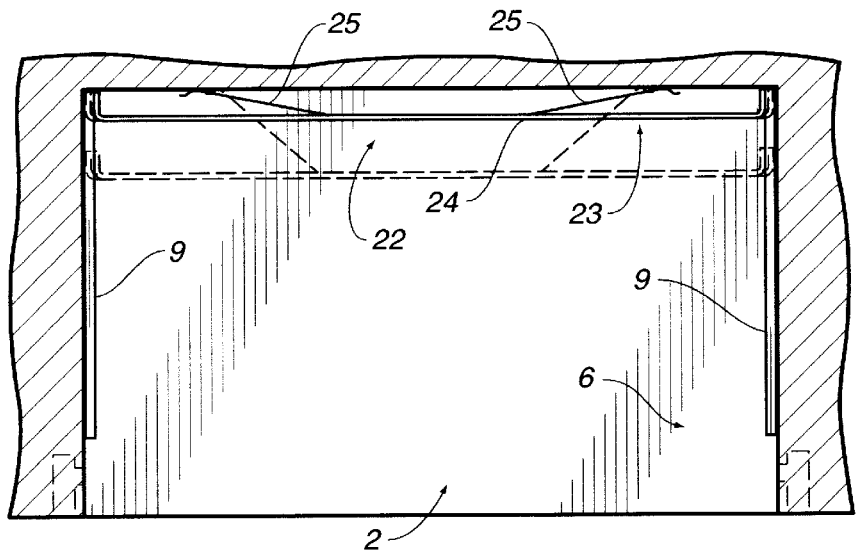
FIG. 8 is a detailed longitudinal cross-sectional view of an exemplary form of embodiment of one of the items of an inside trim for a vehicle according to the invention.

With reference to FIG. 8 also, it can be seen that the extracting/inserting means are formed, by at least one protuberance 9, provided on a wall of the housing 2, and by a groove 8, provided on a wall of the case 1, the groove 8 being able to slide along the protuberance 9.

More precisely, according to the two exemplary forms of embodiment mentioned above, the case 1 is formed, in particular, by a body 10 and by a lid or cover 11, the handle 7 being provided on the body and/or the cover 11, on one hand and/or on the other hand grooves 8 being provided longitudinally on two opposite side faces of the case 1.

In addition, the grooves 8 each co-operate with a protuberance 9. The protuberances 9 being provided facing the grooves, when the case 1 is inserted, along two side faces of the housing 2.

In the forms of embodiment shown in FIGS. 1 to 6, the inside trim for a vehicle, according to the invention, further includes, means for controlling insertion/extraction of the case 1.

Figure 9:
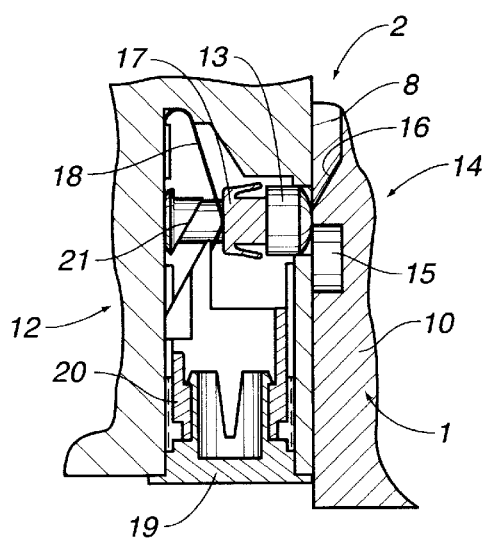
FIG. 9 is a detailed longitudinal cross-sectional view of an exemplary form of embodiment of another of the items of an inside trim for a vehicle according to the invention.

As illustrated in FIG. 9, these control means 12 are formed, in particular, by at least one projection 13, mobile in a direction perpendicular to the direction of insertion/release in the thickness of a wall of the housing 2. In addition, the projection 13 is capable of emerging into the housing 2 and of co-operating with a specially shaped piece 14, provided on the walls of the case 1, in particular in the continuation of the grooves 8.

The projection 13 is formed, by a pin and the profile 14 is formed, by a groove 15 in which the pin 13 can be received after co-operating with a neighboring slope 16, one of the ends of which coincides with the proximal end of a groove 8.

Thus, to be able to extract the case 1 from its housing 2, the pin or pins 13 has/have to be disengaged from its/their groove(s) 15. At the time of insertion, in the reverse operation, the pins 13 slide along grooves 8 and then, through the effect of slope 16, drop into the groove 15.

The pin 13 is, mobile in translation on a rod 17, a leaf spring 18 enabling the pin 13 to be returned to its position in the direction, in particular, of the groove 15 when the latter is opposite it. Again according to the same two forms of embodiment, the control means 12 further, include at least one actuating knob or button 19, capable of determining the movements of the projection 13, the button and/or the buttons 19 being provided on the periphery of the housing 2.

The button or buttons 19 are formed, in particular, by a cam 20, co-operating with an additional thickness 21 provided on the rod 17 of pin 13.

Control means 12 and/or their actuating button 19 are, as illustrated in FIG. 9, integrated in the thickness of the walls of housing 2. According to other forms of embodiment, they can be integrated in an independent member, itself added in the area of the housing 2.

In the two aforementioned forms of embodiment of the invention, the inside trim for a vehicle further includes, means for locking the control means 12. The locking means, not shown, are formed by a worm screw enabling the cam 20 to be moved in the direction of the actuating surface of the button 19 so that the cam 20 can no longer act on the rod 17.

With further reference to FIG. 8, the inside trim for a vehicle according to the invention further, possibly, includes means 22 for disengaging case 1.

These can be, a pressure strip 23 provided between the back of the housing 2 and the back of the case 1. The said strip 23 includes, in particular, a plate 24, actuated by at least one leaf spring 25 bearing against the back of the housing 2.

It should be noted that, according to one advantageous form of embodiment, there is provided, a control button 19 on either side of the lateral sides of case 1, on the periphery of housing 2. Thus, to be able to disengage the case 1, the two control buttons 19 have to be actuated simultaneously, the strip 23 then initiating the extraction and preventing the pins 13 from dropping back into their grooves 15 after the pressure exerted on the buttons 19 has been released.

Figure 10:
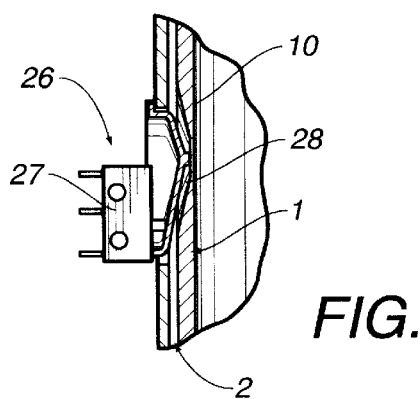
FIG. 10 is a detailed longitudinal cross-sectional view of an exemplary form of embodiment of another of the items of an inside trim for a vehicle according to the invention.

Referring now to FIG. 10, it will be noted that, according to one particular form of implementation, the exemplary forms of embodiment of the invention corresponding to FIGS. 1 to 6 further, possibly, include means 26 for ensuring insertion.

These means are, a microswitch 27, provided in the area of one of the walls of the housing 2, and a cavity 28, provided in the area of the case 1. The microswitch is capable of changing state when the cavity 28 is opposite it, in this way identifying full insertion of the case 1. A flexible strip can, if appropriate, be provided between the microswitch 27 and the cavity 28 in order to promote contact.

According to another form of embodiment, not shown, the means 26 for ensuring insertion further include, a colored strip, provided on the periphery of body 10 of case 1 at its proximal end. Such a strip enables the user to determine, if it is still visible, that case 1 is not correctly inserted.

According to the form of embodiment of the invention corresponding to that more particularly illustrated in FIGS. 1 and 2, the housing 2 forms a cavity, suitable for permitting the stowing of articles after the case 1 has been extracted. According to the definition given above, the back of the housing 2 is then entirely surrounded by side walls.

According to this form of embodiment, the volume of the case 1 Is fixed when it is inside the housing 2. On the other hand, it can perfectly well be adjustable once case 1 has been extracted. Indeed, as illustrated in FIG. 2, it can, possibly, have a wall 29 that is mobile, in particular, in the direction of arrow 30.

The mobile wall 29 can be refrigerated, the refrigerating device being power fed, by means of a connection circuit provided at the back of case 1, connected to a plug at the back of housing 2, through pressure strip 23.

According to the form of embodiment illustrated in FIGS. 3 to 6, the housing 2 is, according to one mode of implementation, not shown, also open towards the floor of the vehicle.

However, according to another mode of implementation, as illustrated in FIG. 5, the housing 2 can also accommodate articles once the case 1 has been extracted thanks, to a shelf or panel 31, sliding vertically, in the direction of arrow 32, particularly in grooves 33, via projections, not shown in the figures.

According to the corresponding form of embodiment, the means for displacing and/or deploying the storage space are further constituted by the case 1, designed to be of a variable volume so that the storage space can be increased beneath the housing 2.

Figure 11:
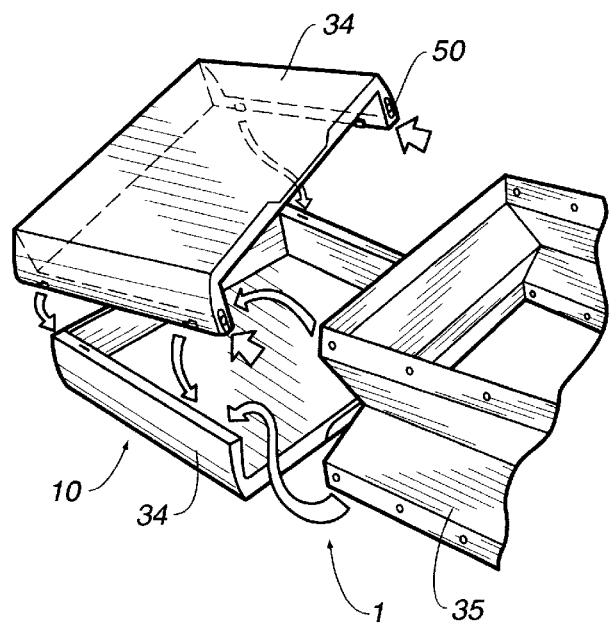
FIG. 11 is an exploded perspective view of the composition of one of the items shown in FIG. 4 above.

As shown in FIG. 11, in this case, the body 10 is formed, by at least two half shells 34, connected by extensible gussets 35. As to the cover 11, it is, for example, extensible.

Guide grooves 8 are then provided, in particular, on one of the half shells 34. In the case illustrated of an application to a dashboard, this will be the upper half shell 34.

In this connection, regarding the form of embodiment shown in FIGS. 1 and 2, the guide grooves 8 are provided, in the vicinity of the axes of symmetry of the lateral faces of the case 1.

According to the form of embodiment shown in FIGS. 3 to 6, the inside trim for a vehicle according to the invention further, possibly, includes means 50 for controlling the deployment of the two half shells 34. These can, be members the structure of which is close to that of the means for inserting extracting case 1.

In this case, still according to this form of embodiment, the extensible cover is formed, by a retractable curtain element. As to the gripping handles 7, as more particularly shown in FIG. 6, these are provided, in particular, on the body 10, on each of the half shells 34 and are, retractable.

With reference, once again, to the form of embodiment corresponding to that illustrated in FIGS. 1 and 2, the housing 2 is able to accommodate, possibly, several cases 1, provided side by side.

In this case, according to this form of embodiment, cover 11 is articulated for rotation on body 10, in particular by means of hinges, not shown, provided on the side faces of the latter. The cover 11 can also, be provided with an opening louver. As to the gripping handle 7, this is, integral with the cover 11 and can, possibly, be extensible.

Figure 7:
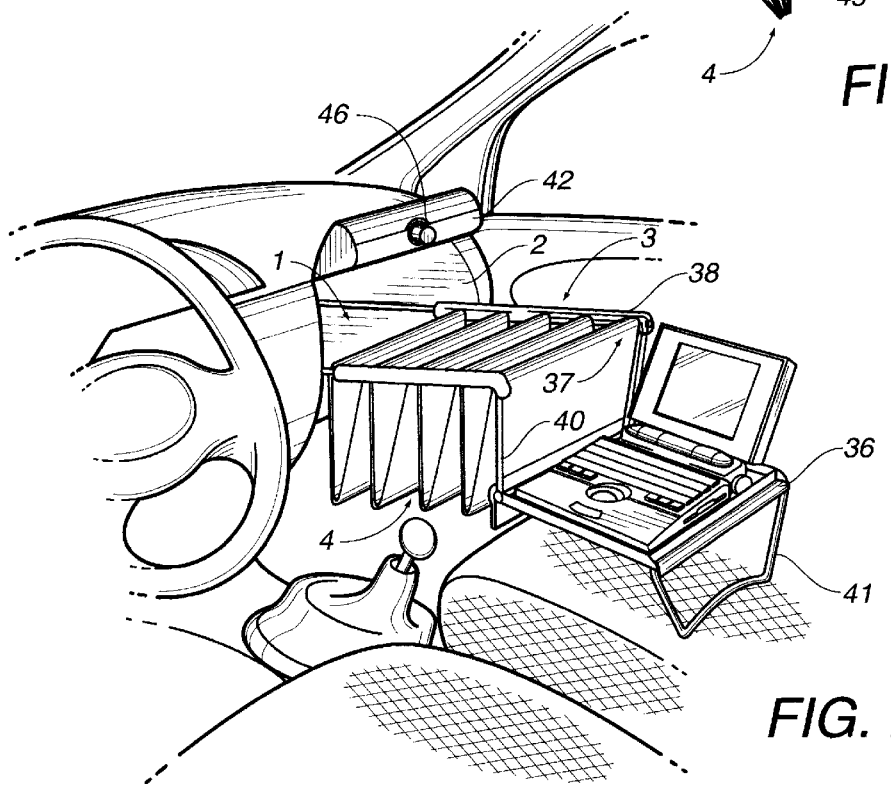
FIG. 7 is a perspective view of a third exemplary form of embodiment of an inside trim for a vehicle according to the invention.

Referring now to the form of embodiment shown in FIG. 7, the case 1 is formed by at least by the walls of the housing 2 and by a panel or flap 36, mobile in relation to the housing 2, while the means for displacing and/or deploying the storage space include at least telescopic means 37 for articulation of the flap 36 outside the housing 2.

According to this form of embodiment, the flap 36 remains, indirectly or directly integral with the housing 2.

Figure 13:
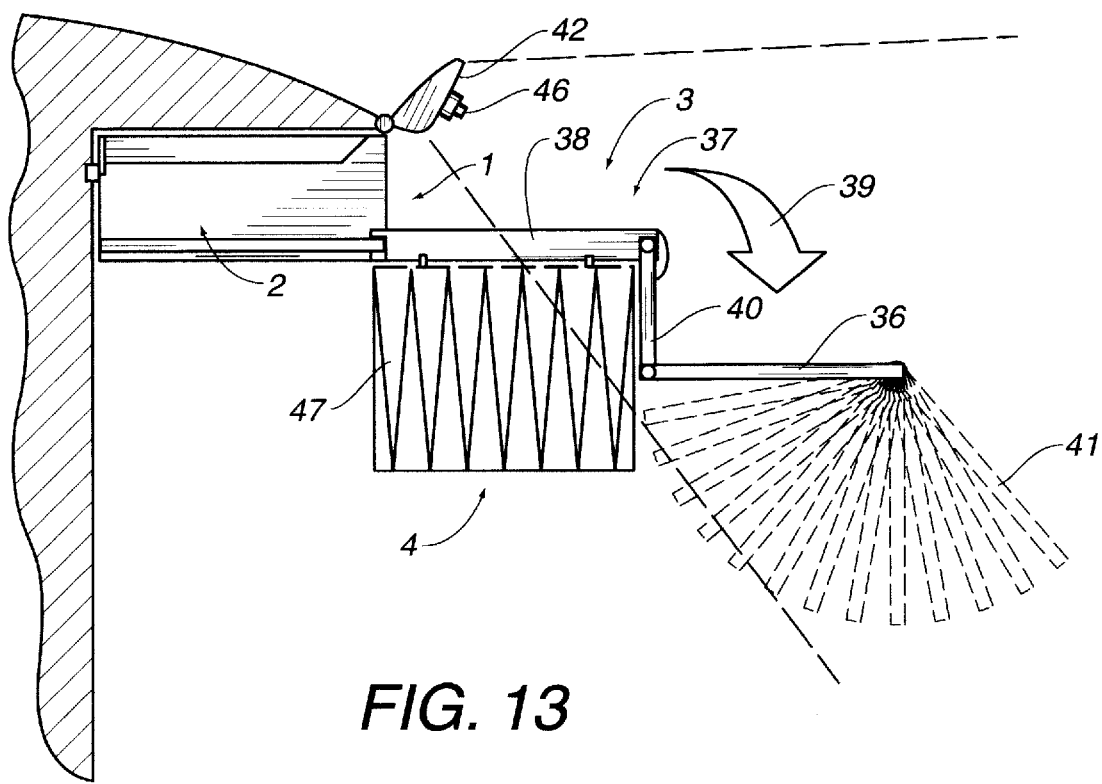
FIG. 13 is a side view illustrating the principle of use of the exemplary form of embodiment of the inside trim for a vehicle according to the invention shown in FIG. 7 above.

As also illustrated in FIG. 13, the articulation means 37 include, in particular, at least telescopic rails 38 in and/or at the end of which the flap 36 is articulated so as to form a working surface outside the housing 2.

The flap 36 is thus, for example, articulated for rotation, in the direction of arrow 39, at the end of telescopic rails 38, via arms 40. The telescopic rails 38 are secured, in particular, to the side walls of housing 2.

In order to stabilize the panel 36 in deployed position, it is provided with a prop 41 capable of bearing upon one of the seats of the vehicle. The prop 41 is, articulated for rotation, as indicated by the dotted lines in FIG. 13, so that it can, in particular, adapt to the height of the seat.

Furthermore, the case 1 is capable, possibly, of being closed by a cover 42, articulatable for rotation on the upper edge of the opening of housing 2.

The cover 42 has a lighting device 46 capable of lighting, in particular, flap 36, as illustrated by the beam represented by dotted lines in FIG. 13.

In addition, according to this form of embodiment, the housing 2 is provided, with electric pre-wiring permitting, in particular, the connection of microcomputers, telephones, facsimile devices and/or others.

Figure 12:
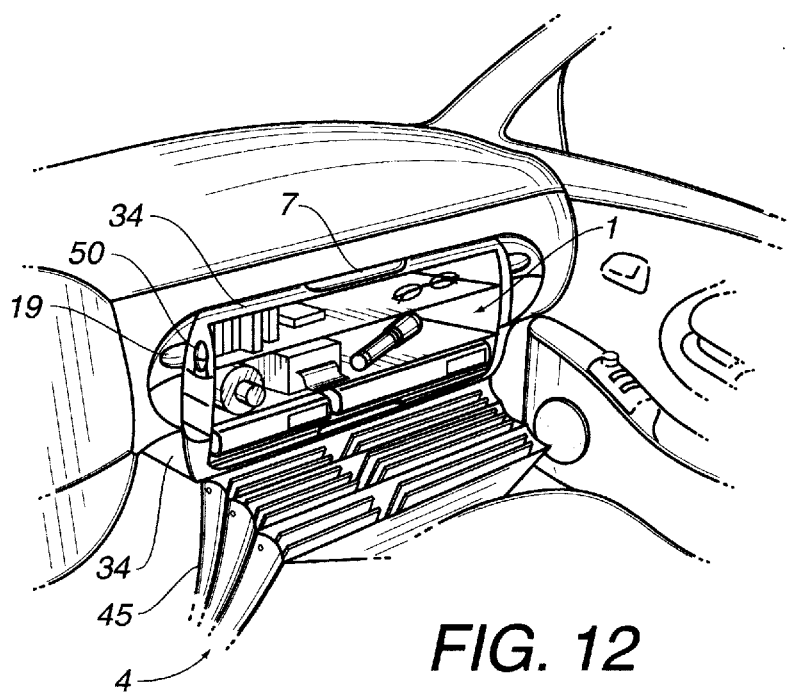
FIG. 12 is a perspective view of the inside trim for a vehicle shown in FIG. 3 above, in a fifth condition.

In this case, the support means 3, mentioned earlier, are formed, as shown in FIG. 6, by slots 43, capable of accommodating hooks 44 integral, in particular, with files or folders 45, as also illustrated in FIG. 12.

According to another form of embodiment, illustrated in FIGS. 7 and 13, the support means 3 are formed, by the telescopic rails 38, designed to be able to support, in particular, suspended files 47.

It goes without saying that other modes of implementation, within the grasp of a man of the art, could have been contemplated without thereby departing from scope of the present application.

What is claimed is:

1. An inside trim apparatus for a vehicle comprising:
   a housing formed within the vehicle;
   a case removably received within said housing;
   a means for insertion and extraction of said case from housing, said means for insertion and extraction comprising;
      at least one protuberance formed on a wall of said housing; and
      a groove formed on a wall of said case, groove slidable over said protuberance; and
   a means for controlling the insertion and extraction of said case from housing, said means for controlling comprising:
      at least one projection movable in a direction perpendicular to a direction of insertion and extraction of said case from housing, said at least one projection being formed in said wall of said housing, said at least one projection extending into an interior area of said housing and cooperative with a piece affixed to a wall of said case and aligned with and extending from said groove.

2. The apparatus of claim 1, said means for controlling further comprising:
   at least one actuating button connected to said projection so as to control a displacement of said projection, said button positioned on a periphery of said housing.

3. The apparatus of claim 1, further comprising:
   a means for disengaging said case from said housing, said means for disengaging formed in said housing.

4. The apparatus of claim 3, said means for disengaging comprising:
   a pressure strip formed between a back of said housing and a back wall of said case.

5. The apparatus of claim 3, further comprising:
   a means for ensuring insertion of said case into said housing, said means for ensuring insertion affixed to said wall of said housing.

6. The apparatus of claim 5, said means for ensuring insertion comprising:
   a microswitch affixed to said wall of said housing; and
   a cavity formed in a surface of said case, said microswitch engageable into said cavity so as to provide a humanly perceivable indication of a full insertion of said case into said housing.

7. The apparatus of claim 1, said housing being formed in a dashboard of the vehicle.

8. The apparatus of claim 1, further comprising:
   a means for supporting a storage device, said means for supporting being formed on a surface of said case.

9. The apparatus of claim 1, further comprising:

means for supporting a storage device, said means for supporting extending outwardly from said case.

10. The apparatus of claim 1, further comprising:

a handle formed on a surface of said case.

11. The apparatus of claim 10, said case comprising:

a body; and a cover connected to said body, said handle affixed to one of said body and said cover, said groove comprising grooves extending longitudinally on respective opposite faces of said case, said protuberance comprising protuberances formed on opposite walls of said housing so as to face respectively said grooves, said protuberances respectively cooperating with said grooves when said case is inserted between said opposite walls of said housing.

12. The apparatus of claim 11, said housing comprising a cavity defined in an area suitable for stowing articles after said case is removed therefrom.

13. The apparatus of claim 11, said body comprising two half shells connected together by an extensible gusset, said cover being extensible.

14. The apparatus of claim 13, said body further comprising means for controlling a deployment of said two half shells connected to an end of said body.

* * * * *